United States Patent
Yang et al.

(10) Patent No.: US 8,189,012 B2
(45) Date of Patent: May 29, 2012

(54) DIGITAL IMAGE COMPOSITION METHOD

(75) Inventors: Chih-Yuan Yang, Hsinchu (TW); Yu-Chen Huang, Hsinchu County (TW); Hong-Long Chou, Taipei (TW)

(73) Assignee: Altek Corporation, Hsinchu (TW)

( * ) Notice: Subject to any disclaimer, the term of this patent is extended or adjusted under 35 U.S.C. 154(b) by 582 days.

(21) Appl. No.: 12/427,830

(22) Filed: Apr. 22, 2009

(65) Prior Publication Data

US 2009/0322787 A1    Dec. 31, 2009

(30) Foreign Application Priority Data

Jun. 27, 2008   (TW) ............................... 97124380 A

(51) Int. Cl.
*G09G 5/37*     (2006.01)
*H04N 5/228*    (2006.01)

(52) U.S. Cl. ..................................... 345/611; 348/208.6

(58) Field of Classification Search .................. 345/611; 348/208.1, 208.6

See application file for complete search history.

(56) References Cited

U.S. PATENT DOCUMENTS 8,072,500 B2 *   12/2011   Gau et al. ................... 348/208.6

* cited by examiner

*Primary Examiner* — Jeffery A Brier
(74) *Attorney, Agent, or Firm* — Rabin & Berdo, P.C.

(57) ABSTRACT

A digital image composition method is adapted to eliminate a ghost image produced by a digital image-capturing apparatus due to handshakes in shooting. The method includes the steps. In a pre-shooting process, a base image and a comparison image are respectively captured. A base pixel is selected from the base image, and a core window is set with the base pixel at the center. A comparison pixel is selected from the comparison image, and a search window is set with the comparison pixel at the center. Each area of the search window is compared through the core window, and an absolute error sum value between the base image and the comparison image is calculated. It is determined how to change the brightness of the base pixel according to the normalized region difference value. The above steps are repeated to adjust each pixel in the base image.

4 Claims, 10 Drawing Sheets

DIGITAL IMAGE COMPOSITION METHOD

CROSS-REFERENCE TO RELATED APPLICATIONS

This non-provisional application claims priority under 35 U.S.C. §119(a) on Patent Application No(s). 097124380 filed in Taiwan, R.O.C. on Jun. 27, 2008 the entire contents of which are hereby incorporated by reference.

BACKGROUND OF THE INVENTION

1. Field of Invention

The present invention relates to a digital image composition method, and more particularly, to a digital image composition method adapted to eliminate a ghost image produced by a digital image-capturing apparatus during shooting.

2. Related Art

Nowadays, with the rapid development of digital cameras, many people choose to record memorable moments by taking photographs. However, no matter in the case of a film camera or a digital camera, blurred images are often produced due to unstable holding of the camera by a user during shooting. As long as the camera is held by bare hands, the shaking problem exists, more or less. The difference is that the hand-holding stability varies among different people, and an involuntary displacement of the camera occurs at the moment the shutter is pressed. Therefore, in order to avoid generating blurred images due to handshakes, digital camera manufacturers employ hardware to prevent the handshakes or software to correct the already blurred digital images.

Thereby, products of each digital camera manufacturer are provided with anti-handshake mechanisms different from others. The anti-handshake mechanisms are capable of detecting and suppressing image blurring phenomena caused by handshakes during shooting. The anti-handshake techniques are mainly realized by hardware or software.

As for hardware, a photosensitive element anti-handshake mode and a mechanical anti-handshake mode are generally adopted. The photosensitive element anti-handshake mode is used for increasing ISO (International Standards Organization, briefly referred to as ISO). Basically, increasing ISO merely allows the shutter to finish the action before any shaking is felt. However, increasing ISO also brings about more noises. The mechanical anti-handshake mode is to configure a motion detecting element in the digital camera. On detecting a handshake, the digital camera moves its lens in a direction opposite to that of the handshake so as to compensate the image blurring caused by displacement. Another anti-handshake method is to enlarge the aperture for increasing the amount of the incident light so as to shorten a shutter time. However, the size of the aperture depends on a combined architecture of the lens set. Generally speaking, a camera lens of a large aperture is high in cost and large in volume, and is thus difficult to be configured in consumer digital cameras.

Another mode is to compose a plurality of digital images. Although a better visual effect can be achieved, a ghost image is prone to be produced during the image composition. The reason is that a subject to be shot is not at a fixed position when two digital images are captured, so the same subject appears at different positions when the two digital images are directly composed. Referring to FIG. 1, a schematic view of a conventional composition method is shown. In FIG. 1, the top left picture is a digital image 110 captured at a first time, and the bottom left picture is a digital image 120 captured at a second time. If the two digital images are directly composed, a ghost image with the same subject appearing at different positions is shown in the right picture (digital image 130) of FIG. 1.

SUMMARY OF THE INVENTION

Accordingly, the present invention is directed to a digital image composition method, adapted to eliminate a ghost image produced by a digital image-capturing apparatus due to handshakes in shooting.

In order to achieve the above objective, a digital image composition method is provided. The method includes the following steps. A base image and a comparison image are captured. A base pixel is selected from the base image, and a core window is set with the base pixel at the center, so as to circle a plurality of pixels. A corresponding comparison pixel is found out from the comparison image according to an image position of the base pixel, and a search window is set with the comparison pixel at the center, so as to circle a plurality of pixels. A plurality of pixels are selected from the search window, difference value calculations are respectively performed on the selected pixels and each pixel in the core window, and all difference values are accumulated so as to output an absolute error sum value. A plurality of primary region difference lookup tables is loaded. A normalized region difference value is obtained according to the primary difference region lookup tables and the absolute error sum value. If the normalized region difference value is larger than a threshold value, the brightness of the base pixel is increased. If the normalized region difference value is smaller than a threshold value, a brightness of the comparison pixel is added to the brightness of the base pixel, so as to generate a modified pixel. The above steps are repeated until all the pixels in the base image are completed. The modified pixels are then combined into a composed image according to positions thereof.

The present invention provides an image composition method adapted to eliminate a ghost image produced by a digital image-capturing apparatus during shooting. In the method, two images out of a plurality of images captured in a pre-shooting process are composed. Brightness adjustment is performed according to identical pixels in the above two digital images in the present invention. After all the pixels are subjected to the above processing, the processed pixels are sequentially combined into a composed image.

BRIEF DESCRIPTION OF THE DRAWINGS

The present invention will become more fully understood from the detailed description given herein below for illustration only, and thus are not limitative of the present invention, and wherein:

FIG. 3b is a schematic view of a comparison image;

FIG. 3c is a schematic view of an arrangement of a core window in a search window;

DETAILED DESCRIPTION OF THE INVENTION

Figure 1:
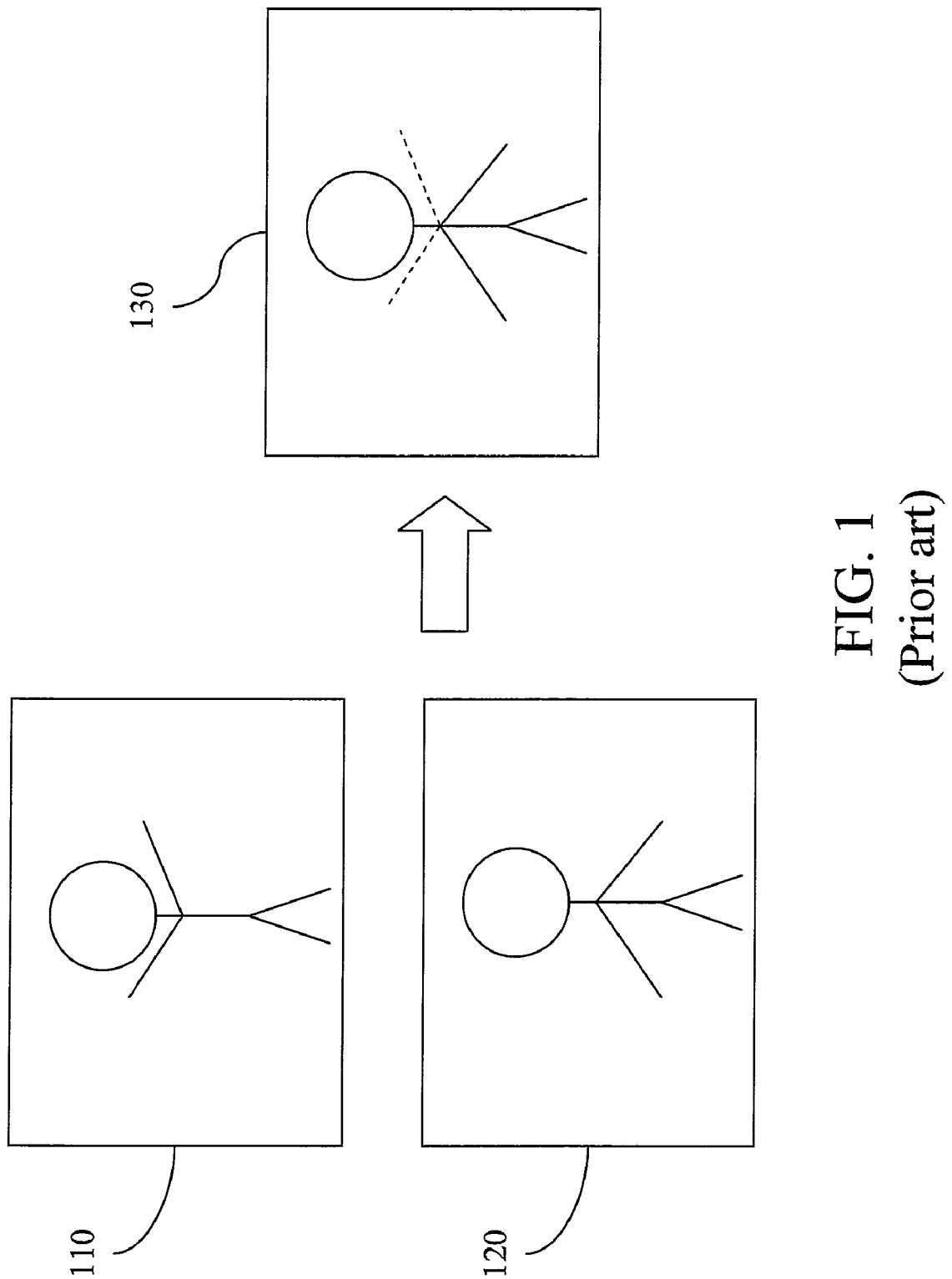
FIG. 1 is a schematic view of a conventional composition method.
Figure 2:
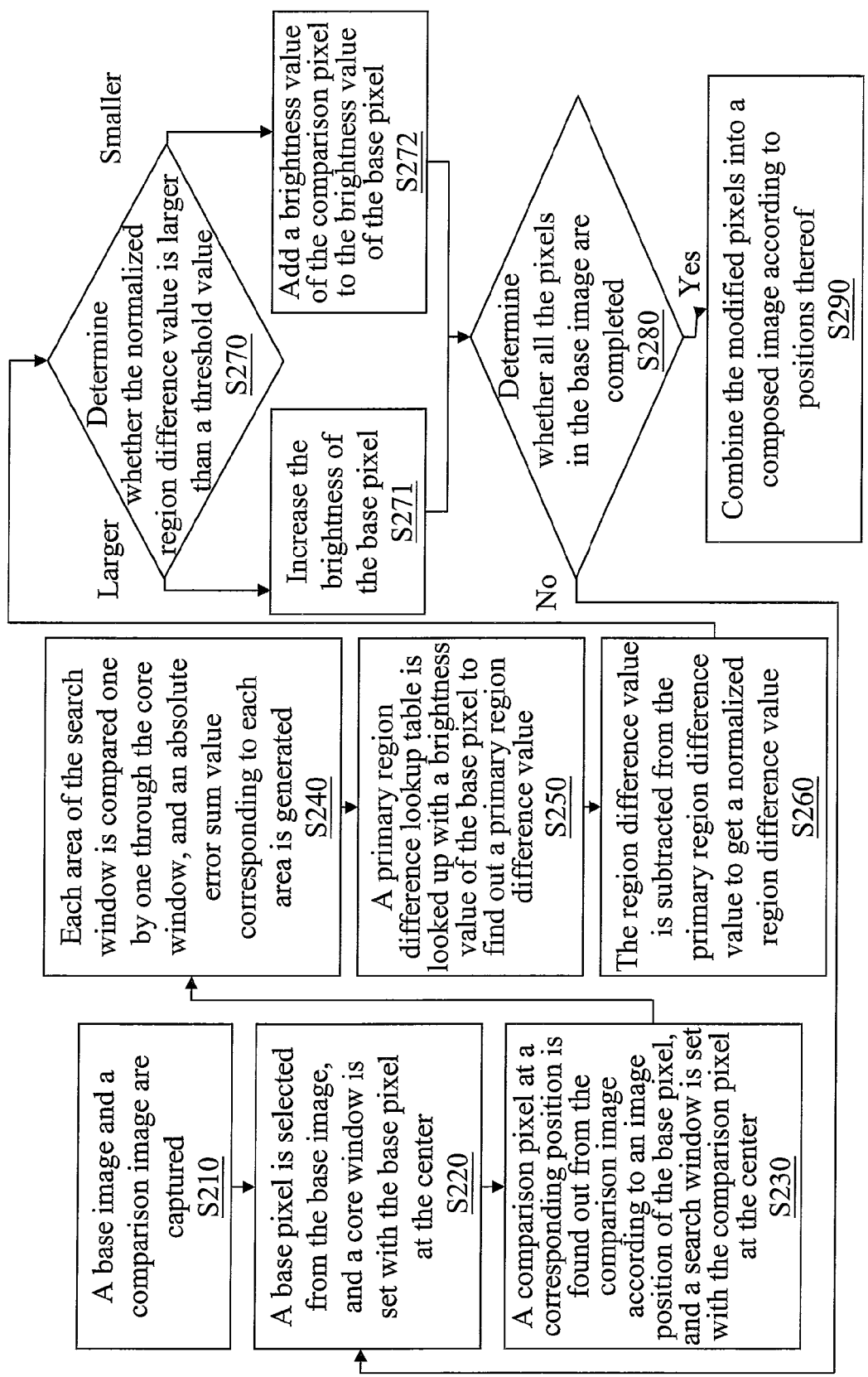
FIG. 2 is a schematic flow chart of the present invention.

The present invention can not only be implemented in computer apparatus by software, but also implemented in various hand-held computer apparatus by firmware. FIG. 2 is a schematic flow chart of the present invention.

Figure 3A:
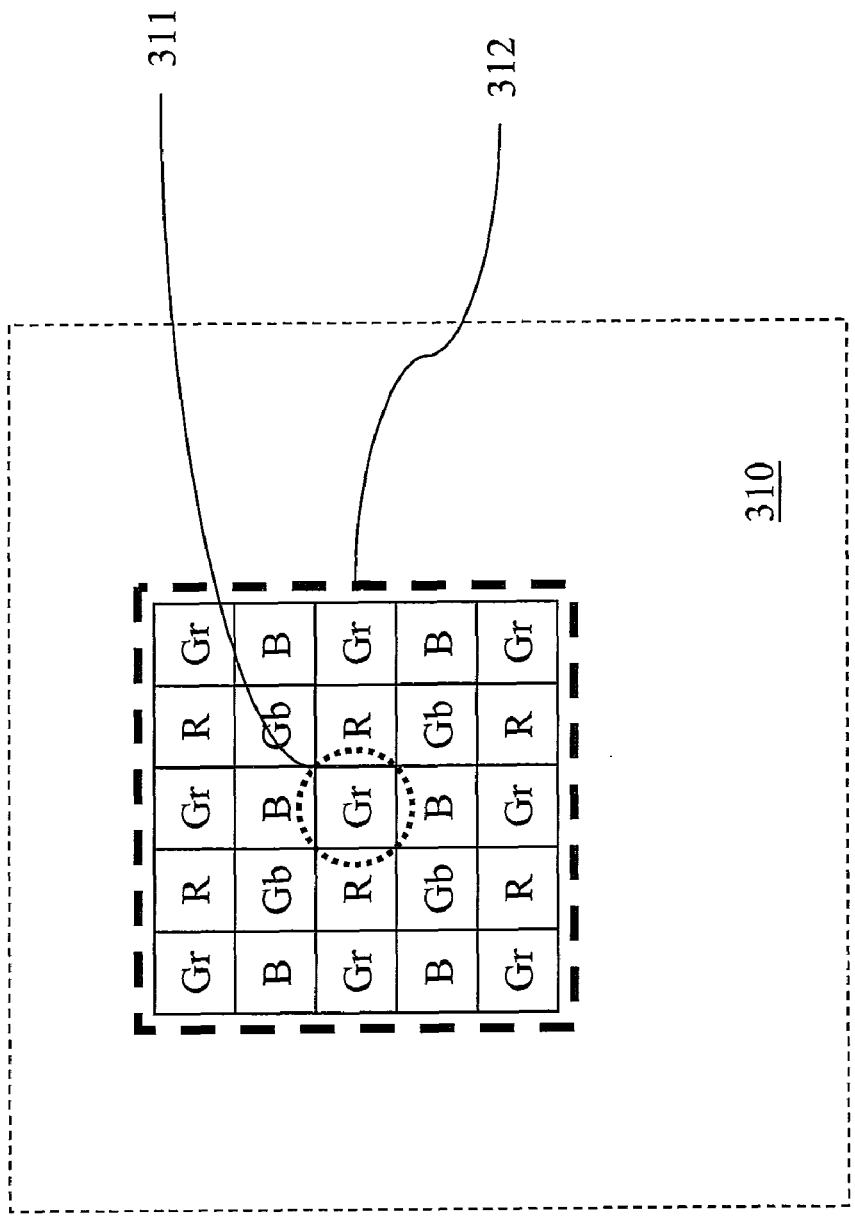
FIG. 3a is a schematic view of a base image.
Figure 3B:
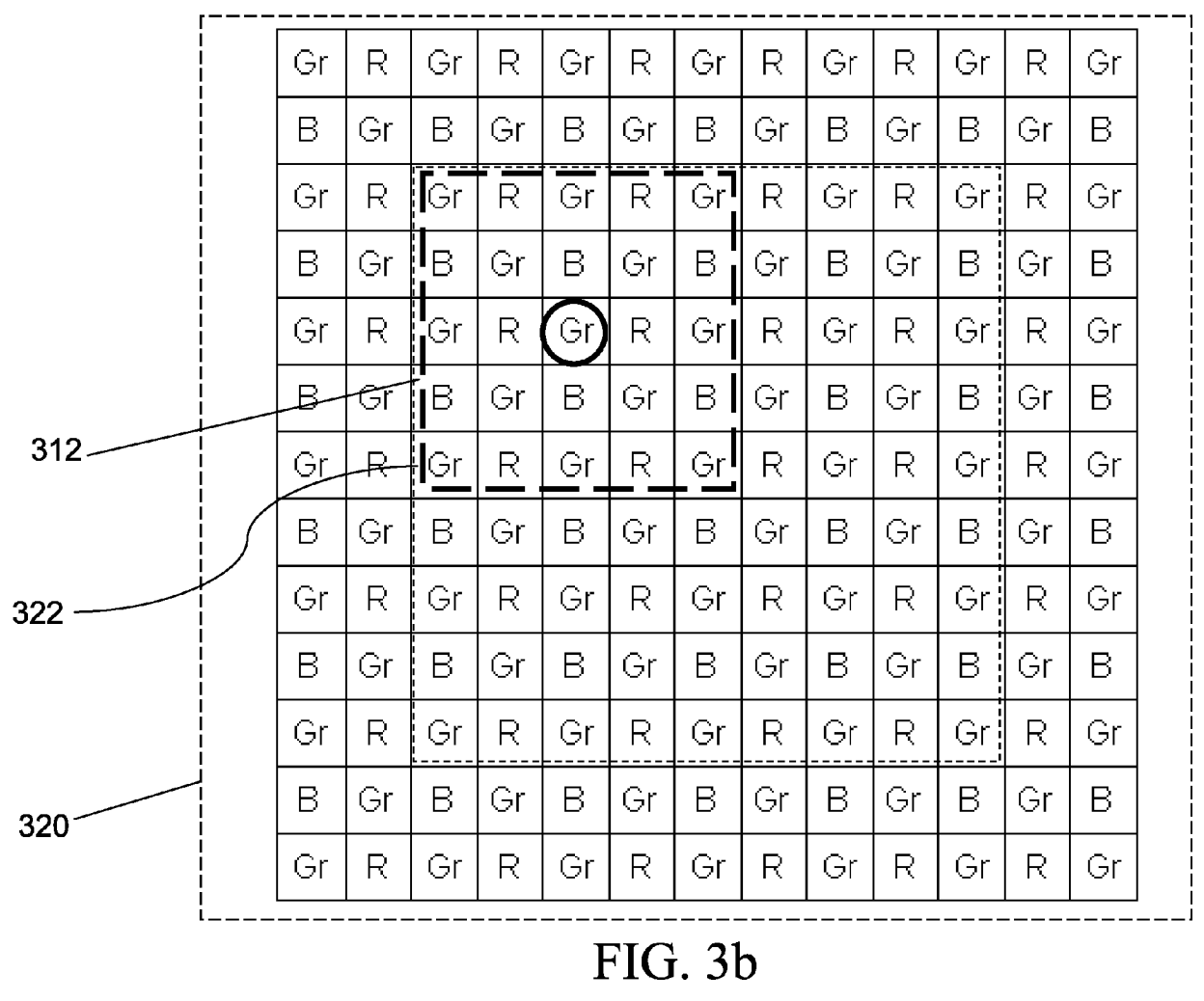
Figure 3C:
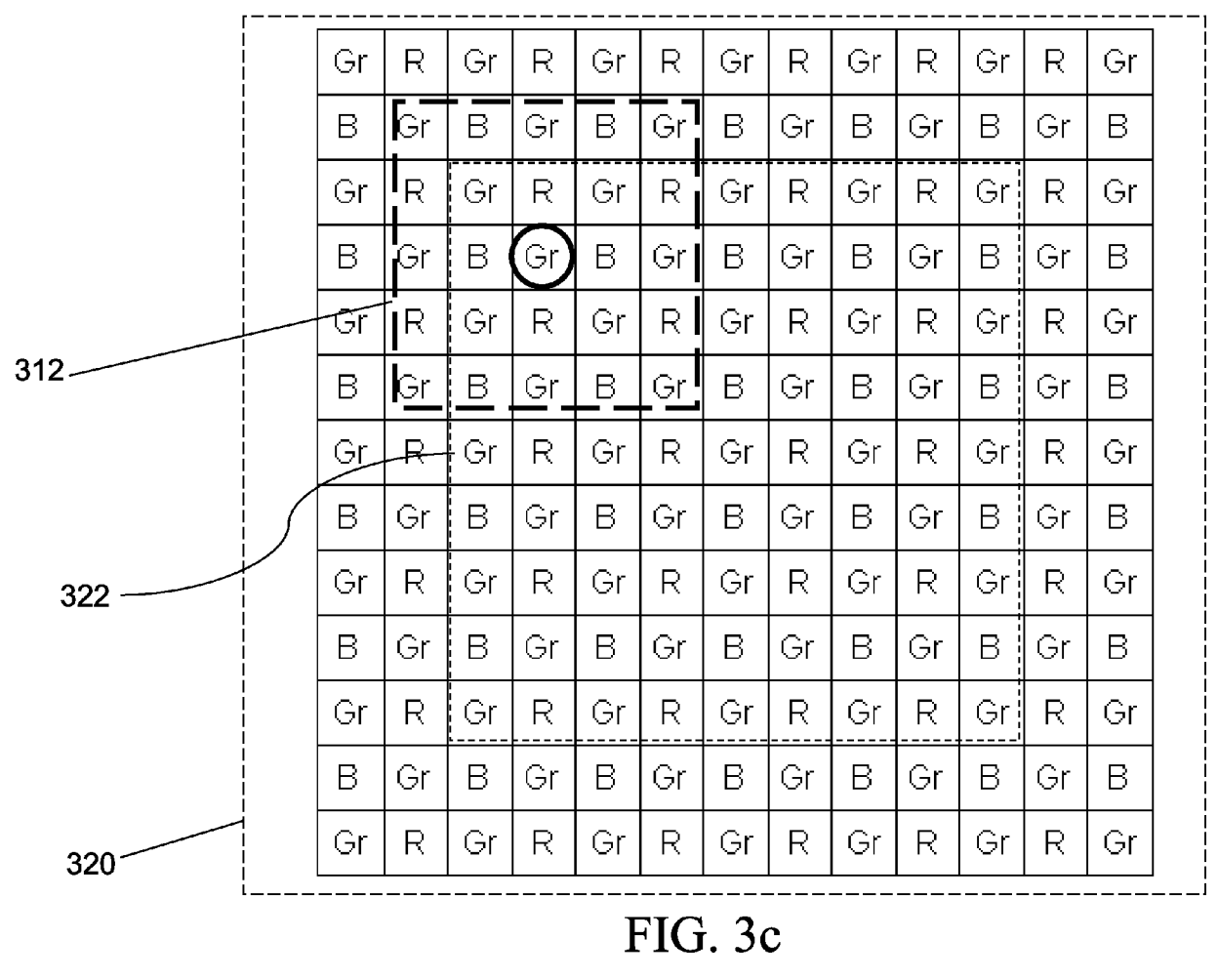
Figure 3D:
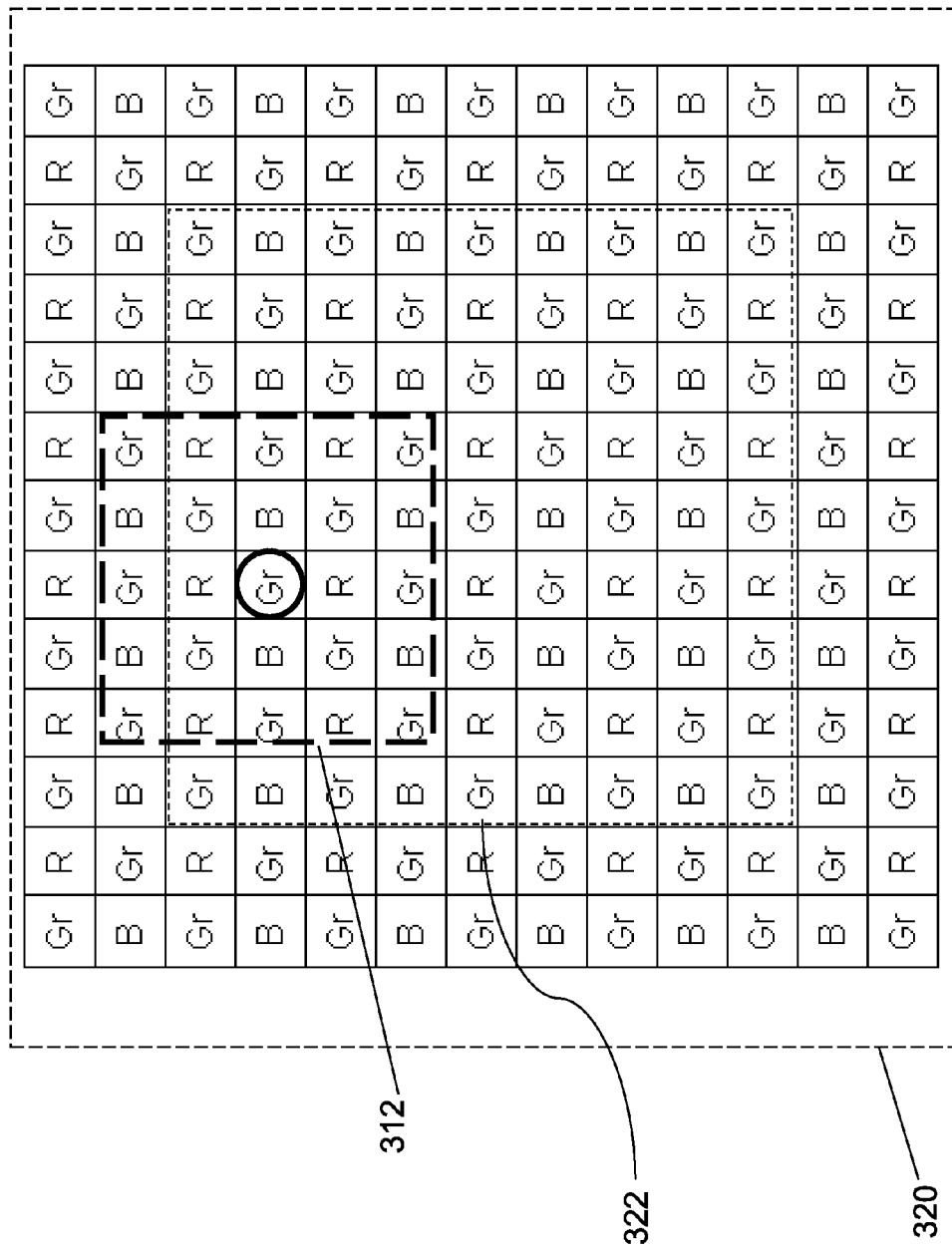
FIG. 3d is a schematic view of an arrangement of a core window in a search window.
Figure 3E:
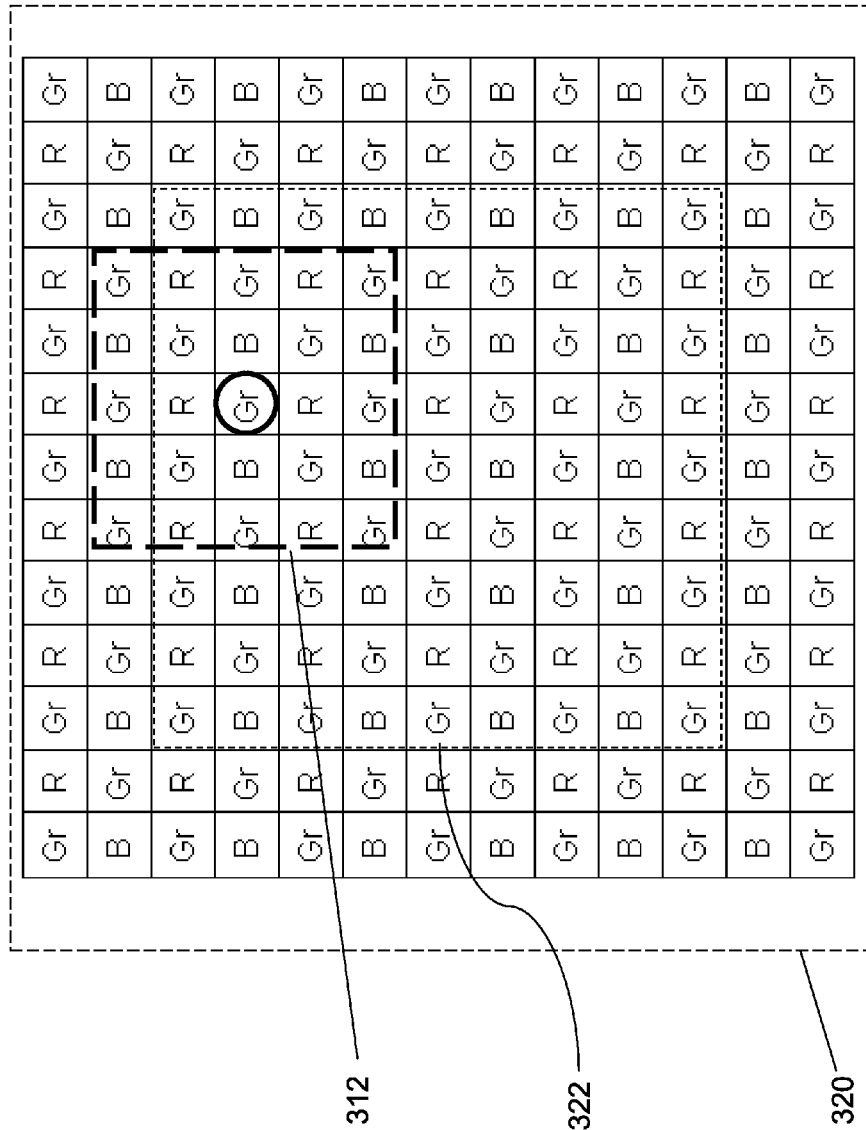
FIG. 3e is a schematic view of an arrangement of a core window in a search window.
Figure 3F:
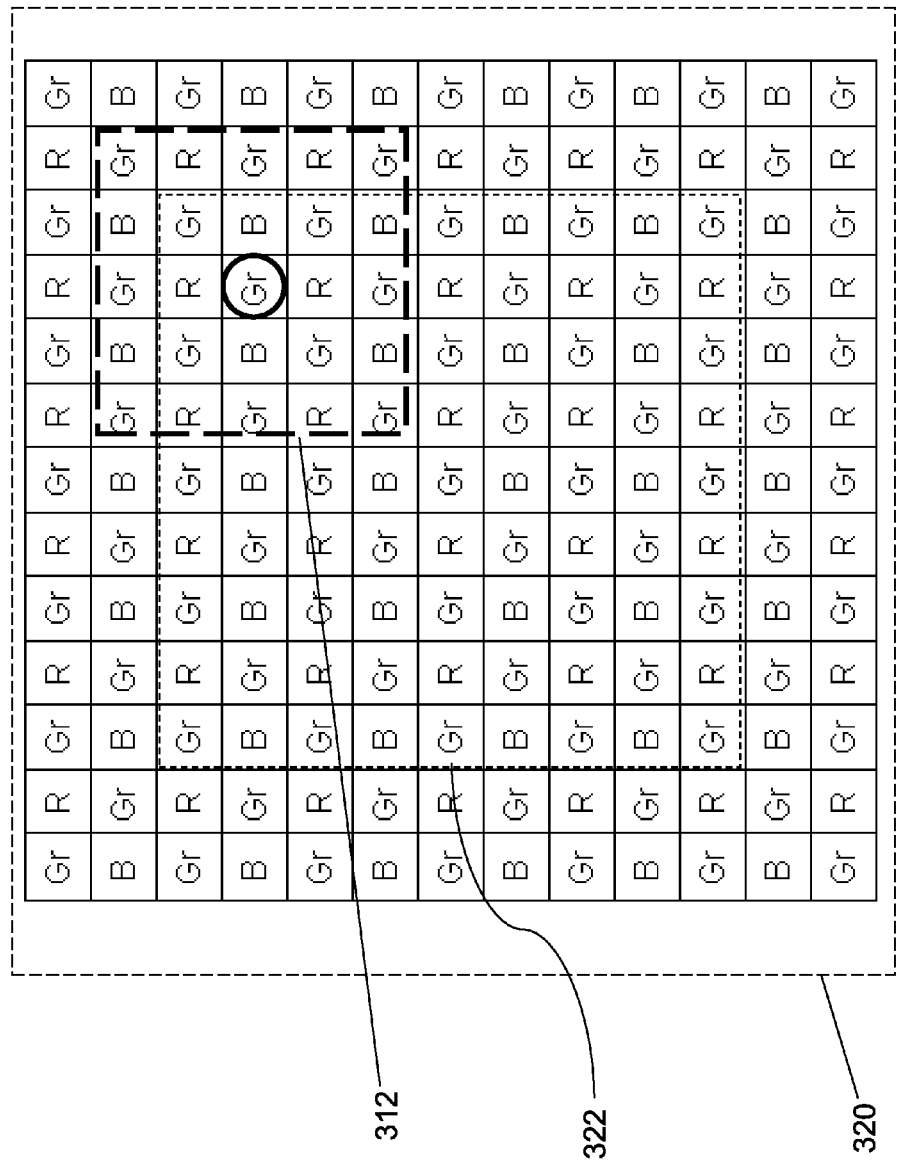
FIG. 3f is a schematic view of an arrangement of a core window in a search window.
Figure 3G:
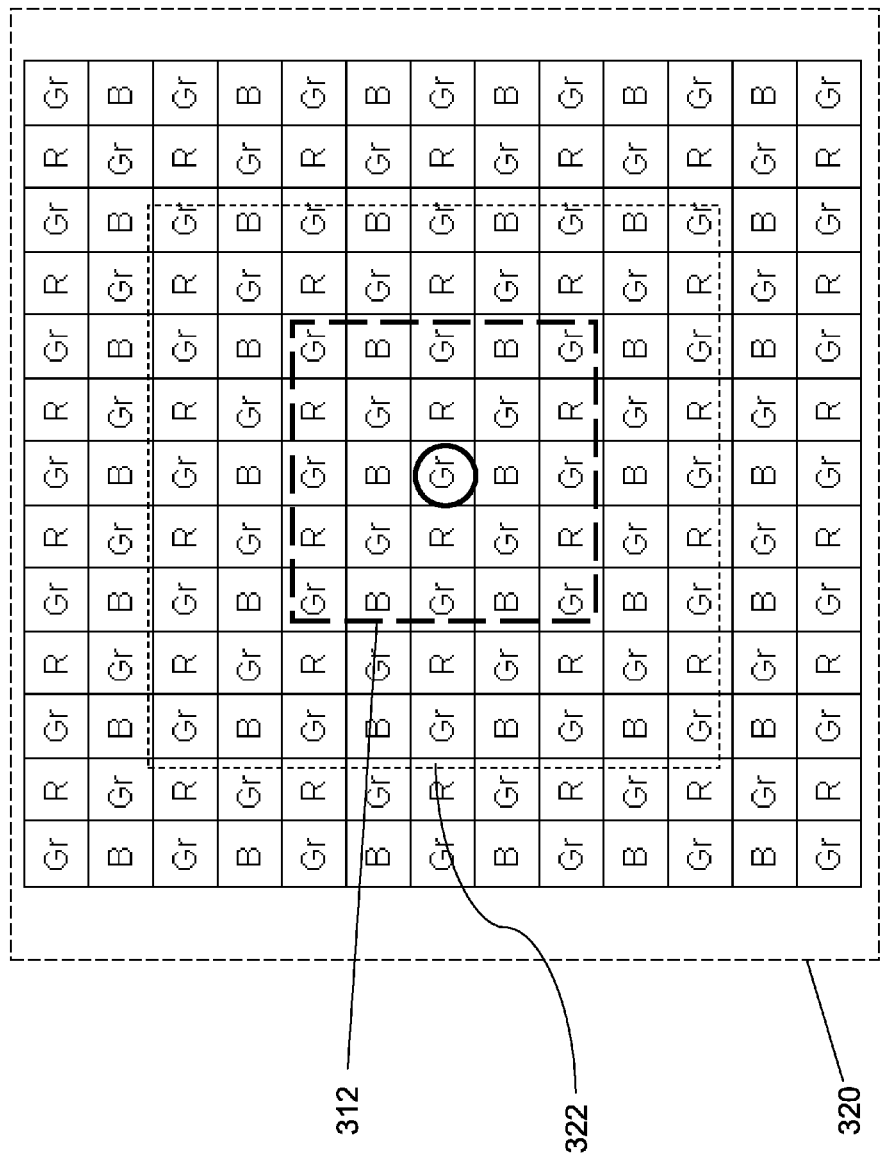
FIG. 3g is a schematic view of an arrangement of a core window in a search window.

First, a base image and a comparison image are captured (Step S210). The base image 310 and the comparison image 320 are respectively in Bayer patterns. FIGS. 3a and 3b are respectively a schematic view of the base image and a schematic view of the comparison image. A pixel arrangement of the Bayer pattern in the present invention is in the form of Gr, R, Gr, R, Gr, B, Gb, B, Gb, . . . , Gr, and R from the top left corner of a core window 312 to bottom, as shown in FIG. 3a. In addition, the present invention is also applicable to patterns of other pixel configurations like RGBW patterns, Kodak RGBW patterns, or CYGM patterns, so the present invention is not limited herein.

Next, a base pixel is selected from the base image, and a core window is set with the base pixel at the center (Step S220). In the present invention, a coverage of the core window 312 may be a pixel array of 3*3, 5*5, or in other sizes. A thick black dotted line in FIG. 3a marks the core window 312, and a circular dotted line in the core window 312 marks the base pixel 311. A comparison pixel at a corresponding position is found out from the comparison image according to an image position of the base pixel, and a search window is set with the comparison pixel at the center (Step S230). The position of the comparison pixel depends on that of the base pixel 311 in the base image 310. A coverage of the search window 322 may be a pixel array of 3*3, 5*5, or in other sizes. The coverage of the core window 312 is smaller than or equal to that of the search window 322.

Each area of the search window is compared one by one through the core window, and an absolute error sum value corresponding to each area is generated (Step S240). The positions of the core window 312 and the search window 322 are shown in FIG. 3b. The absolute error sum (SAD, Sum Absolute Difference) value is obtained by the following formula 1.

$$SAD = \sum_{u=-w}^{w} \sum_{v=-w}^{w} |A(i+u, j+v) - C(i'+u, j'+v)| \quad \text{Formula 1}$$

A is the base image 310, C is the comparison image 320, w is a value obtained by subtracting 1 from a width of the core window 312 and then divided by 2, (i,j) is a coordinate position of the base pixel 311 in the base image 310, and (i',j') is a coordinate position of the comparison pixel in the comparison image. (i',j') is a coordinate of a central pixel of each sub-area in the search window that consists with the identical pattern arrangement with the core window 312. In particular, according to the present invention, (i',j') is obtained by comparing the search window 322 with the core window 312. That is, areas of an identical pixel color arrangement in the search window 322 are compared according to a pixel color arrangement in the core window 312. To explain more clearly, a core window 312 of 5*5 and a search window 322 of 9*9 are taken as an example by referring to the above pixel arrangement of the core window 312 in FIG. 3a. In the core window 312, Gr, R, Gr, R, Gr, B, Gb, B, Gb, . . . , R, and Gr are arranged from the top left corner to the top right corner and then from top to bottom. Twenty-five areas of the same arrangement can be found from the search window 322 according to the above pixel color arrangement. Since there are more than one (i',j') in the search window 322, taking FIG. 3b for example, the number of (i',j') is 25. If a coordinate of a central point of the 25 points is (i*,j*) (just the point at the center of the core window 312), the relationship between (i',j') and (i*,j*) is as follows:

$$i'=i^*+kk\epsilon\{0,\pm2,\pm4,\ldots\}, j'=j^*+ll\epsilon\{0,\pm2,\pm4\ldots\}.$$

In order to clearly illustrate various different arrangements, taking FIG. 3b as an example and both referring to FIGS. 3c, 3d, 3e, 3f, and 3g, various arrangements of the core window 312 in the search window 322 are shown. Then, an absolute error sum value corresponding to each area of the identical arrangement is calculated.

Figure 4:
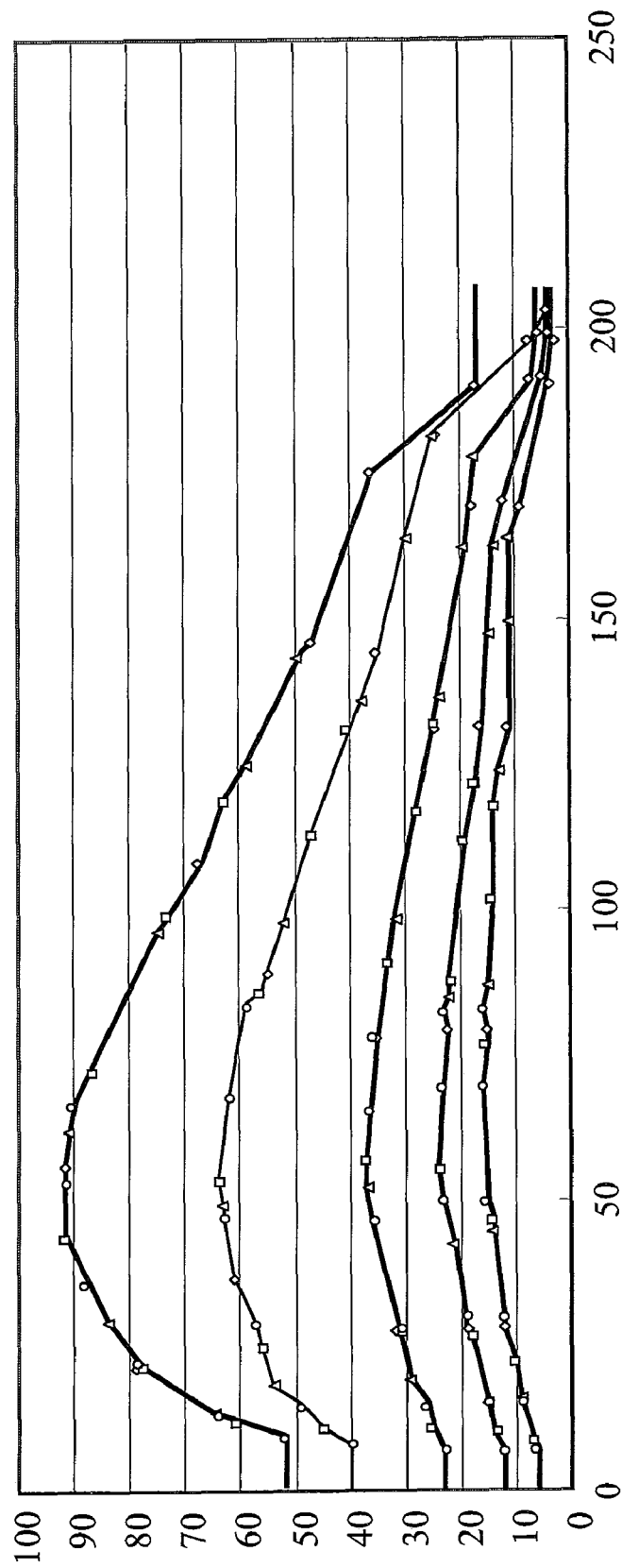
FIG. 4 is a schematic linear view of a primary region difference lookup table.

The region difference value is defined as the minimum value among those SAD values obtained by comparing the identically arranged points in the search window 322 one by one. RegDiff=min($SAD_1$, $SAD_2$, . . . , $SAD_n$), where n is a total number of the identically arranged pixels in the search window that can be compared by the core window. A primary region difference lookup table is looked up with a brightness value of the base pixel to find out a primary region difference value (Step S250). FIG. 4 is a schematic linear view of a primary region difference lookup table. Referring to FIG. 4, the lateral axis is the brightness value of the base pixels, and the longitudinal axis is the primary region difference value. There are different primary region difference curves for different ISOs.

The region difference value is subtracted from the primary region difference value to get a normalized region difference value (Step S260). It is determined whether the normalized region difference value is larger than a threshold value (Step S270), and if yes, the brightness of the base pixel is increased (Step S271); otherwise, a brightness value of the comparison pixel corresponding to the minimum absolute error sum value is added to the brightness value of the base pixel (Step S272). Afterward, it is determined whether all the pixels in the base image are completed (Step S280), and if not, Step S220 is repeated till the comparison processing of all the base pixels is completed. Finally, the modified pixels are combined into a composed image according to positions thereof (Step S290).

The present invention provides an image composition method adapted to eliminate a ghost image produced by a digital image-capturing apparatus during shooting. In the method, two images out of a plurality of images captured in a pre-shooting process are composed. Brightness adjustment is performed according to identical color pixels in the above two digital images in the present invention. After all the pixels are subjected to the above processing, the processed pixels are sequentially combined into a composed image.

What is claimed is:

1. A digital image composition method, adapted to eliminate a ghost image produced by a digital image-capturing apparatus due to handshakes in shooting, the method comprising:

capturing a base image and a comparison image;

selecting a base pixel from the base image, and setting a core window with the base pixel at the center;

finding out a comparison pixel at a corresponding position from the comparison image according to an image position of the base pixel, and setting a search window with the comparison pixel at the center;

comparing pixels in the core window one by one with pixels in a plurality of areas, wherein a center pixel of each of the areas is inside the search window, and a color pixel arrangement of each of the areas is identical to a color pixel arrangement of the core window;

generating an absolute error sum value corresponding to each of the areas;

looking up a primary region difference lookup table with a brightness value of the base pixel to find out a primary region difference value;

subtracting the minimum absolute error sum value from the primary region difference value to get a normalized region difference value;

determining whether the normalized region difference value is larger than a threshold value;

increasing the brightness of the base pixel, if the normalized region difference value is larger than a threshold value;

adding the brightness value of the base pixel to a brightness value of the comparison pixel corresponding to the minimum absolute error sum value, if the normalized region difference value is smaller than a threshold value; and completing all the pixels in the base image, and combining the modified pixels into a composed image according to positions thereof.

2. The digital image composition method according to claim 1, wherein the base image and the comparison image are in Bayer patterns, RGBW patterns, Kodak RGBW patterns, or CYGM patterns.

3. The digital image composition method according to claim 1, wherein a coverage of the core window is smaller than or equal to that of the search window.

4. The digital image composition method according to claim 1, wherein the pixels in each area of the search window are compared one by one through the core window, and the corresponding absolute error sum value is produced according to $$SAD = \sum_{u=-w}^{w} \sum_{v=-w}^{w} |A(i+u, j+v) - C(i'+u, j'+v)|,$$

where A is the base image, C is the comparison image, (i,j) is a coordinate position of the base pixel in the base image, (i',j') is a coordinate position of the comparison pixel in the comparison image, and w is a value obtained by subtracting 1 from a width of the core window and then divided by 2.

* * * * *